United States Patent
Haddad et al.

(10) Patent No.: US 6,195,001 B1
(45) Date of Patent: Feb. 27, 2001

(54) AUXILIARY SIGNAL TO INDICATE A U-TURN

(76) Inventors: Nabeel Haddad; Sam Bandak, both of 738 North Baker Ave., Ontario, CA (US) 91764

(*) Notice: Subject to any disclaimer, the term of this patent is extended or adjusted under 35 U.S.C. 154(b) by 0 days.

(21) Appl. No.: 09/263,275

(22) Filed: Mar. 5, 1999

(51) Int. Cl.[7] .................................................. B60Q 1/34
(52) U.S. Cl. ........................ 340/475; 340/465; 340/477
(58) Field of Search .................................... 340/463, 465, 340/468, 472, 473, 475, 477

(56) References Cited

U.S. PATENT DOCUMENTS

| | | | |
|---|---|---|---|
| 4,387,361 | 6/1983 | Reed | 340/73 |
| 4,868,541 | 9/1989 | Sullivan | 340/465 |
| 5,003,289 | * 3/1991 | Roman | 340/468 |
| 5,281,950 | * 1/1994 | Le | 340/475 |
| 5,663,708 | 9/1997 | Strawn | 340/465 |
| 5,666,103 | * 9/1997 | Davis, Jr. | 340/475 |
| 5,680,100 | 10/1997 | Millsap | 340/463 |
| 5,900,813 | * 5/1999 | Ruminski et al. | 340/475 |

* cited by examiner

*Primary Examiner*—Daniel J. Wu
(74) *Attorney, Agent, or Firm*—Goldstein & Canino

(57) ABSTRACT

An auxiliary signal to indicate a U-turn including a housing securable to an interior of a motor vehicle. The housing is defined by a closed forward face and an open rearward face. The open rearward face has a plate disposed therein. The plate has an inverted translucent U in a central portion thereof. A light is secured within the housing intermediate the open rearward face and the closed forward face thereof. The light is in communication with a battery of the motor vehicle. A receiver is disposed within the housing. The receiver is in communication with the light. A timer is disposed within the housing. A transmitter is securable within the interior of the motor vehicle adjacent to a drivers seat thereof. The transmitter is in communication with the receiver.

6 Claims, 2 Drawing Sheets

AUXILIARY SIGNAL TO INDICATE A U-TURN

BACKGROUND OF THE INVENTION

The present invention relates to an auxiliary signal to indicate a U-turn and more particularly pertains to alerting a vehicle traveling behind one's own vehicle that a U-turn will be performed.

Modern automobiles have signal lights to alert motorists that the driver is intending to make a turn or is applying the brakes. However, when driver's wishes to make U-turns, they must either turn on the left hand flashing signal light or provide no signal to an on-coming motorist. This lack of a proper signaling device when a U-turn is intended presents a confusing and dangerous situation. The present invention seeks to overcome this situation by providing for a transmitter which can independently activate a flashing light that is mountable to a rear or front of the vehicle so as to alert other motorists that a U-turn is about to occur.

The use of signal lights is known in the prior art. More specifically, signal lights heretofore devised and utilized for the purpose of alerting motorists of a driver's intentions are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,868,541 to Sullivan discloses a manual, ultrasonic transmitting means for activating a vehicle mountable U-turn signal that is solar powered. U.S. Pat. No. 5,680,100 to Millsap discloses a Uturn icon mounted on the front or rear of a vehicle and placed over a light bulb with similar operations as a turn signal. U.S. Pat. No. 4,387,361 to Reed and U.S. Pat. No. 5,663,708 to Strawn each disclose additional U-turn signaling devices.

While these devices fulfill their respective, particular objective and requirements, the aforementioned patents do not describe an auxiliary signal to indicate a U-turn for alerting a vehicle traveling behind one's own vehicle that a U-turn will be performed.

In this respect, the auxiliary signal to indicate a Uturn according to the present invention substantially departs from the conventional concepts and designs of the prior art, and in doing so provides an apparatus primarily developed for the purpose of alerting a vehicle traveling behind one's own vehicle that a Uturn will be performed.

Therefore, it can be appreciated that there exists a continuing need for new and improved auxiliary signal to indicate a U-turn which can be used for alerting a vehicle traveling behind one's own vehicle that a U-turn will be performed. In this regard, the present invention substantially fulfills this need.

SUMMARY OF THE INVENTION

In the view of the foregoing disadvantages inherent in the known types of signal lights now present in the prior art, the present invention provides an improved auxiliary signal to indicate a U-turn. As such, the general purpose of the present invention, which will be described subsequently in greater detail, is to provide a new and improved auxiliary signal to indicate a U-turn and method which has all the advantages of the prior art and none of the disadvantages.

To attain this, the present invention essentially comprises a housing securable to an interior of a motor vehicle at a left corner of a rear window thereof. The housing has a generally circular configuration defined by a closed forward face, an open rearward face and a cylindrical side wall therebetween. The open rearward face has a plate disposed therein. The plate has an inverted translucent U in a central portion thereof. One of two opposed free ends of the U has an arrow directed downwardly therefrom. A light is secured within the housing intermediate the open rearward face and the closed forward face thereof. The light is in communication with a battery of the motor vehicle. A receiver is disposed within the housing. The receiver is in communication with the light. A timer is disposed within the housing. The timer is in communication with the light. A flasher circuit is disposed within the housing. The flasher circuit is in communication with the light. A transmitter is securable within the interior of the motor vehicle adjacent to a drivers seat thereof. The transmitter is in communication with the receiver.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved auxiliary signal to indicate a U-turn which has all the advantages of the prior art signal lights and none of the disadvantages.

It is another object of the present invention to provide a new and improved auxiliary signal to indicate a U-turn which may be easily and efficiently manufactured and marketed.

It is a further object of the present invention to provide a new and improved auxiliary signal to indicate a U-turn which is of durable and reliable construction.

An even further object of the present invention is to provide a new and improved auxiliary signal to indicate a U-turn which is susceptible of a low cost of manufacture with regard to both materials and labor, and which accordingly is then susceptible of low prices of sale to the consuming public, thereby making such an auxiliary signal to indicate a U-turn economically available to the buying public.

Even still another object of the present invention is to provide a new and improved auxiliary signal to indicate a U-turn for alerting a vehicle traveling behind one's own vehicle that a U-turn will be performed.

Lastly, it is an object of the present invention to provide a new and improved auxiliary signal to indicate a U-turn including a housing securable to an interior of a motor vehicle. The housing is defined by a closed forward face and an open rearward face. The open rearward face has a plate disposed therein. The plate has an inverted translucent U in a central portion thereof. A light is secured within the housing intermediate the open rearward face and the closed forward face thereof. The light is in communication with a battery of the motor vehicle. A receiver is disposed within the housing. The receiver is in communication with the light. A timer is disposed within the housing. A transmitter is securable within the interior of the motor vehicle adjacent to a drivers seat thereof. The transmitter is in communication with the receiver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
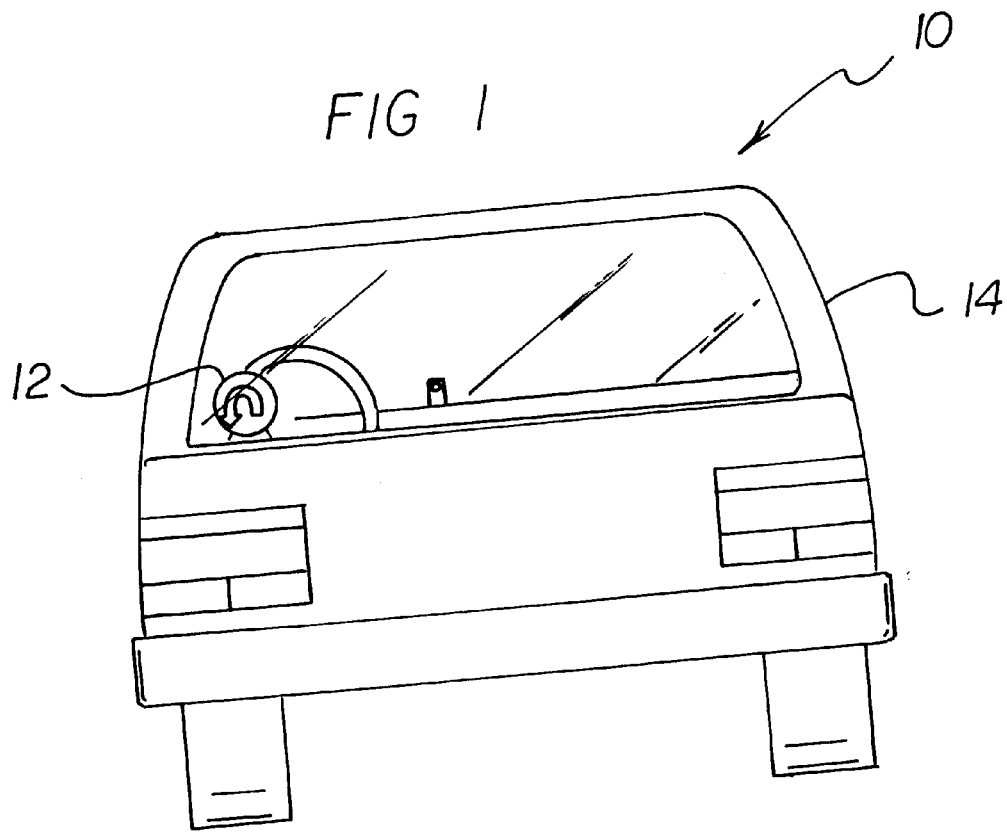
FIG. 1 is a perspective view of the preferred embodiment of the auxiliary signal to indicate a U-turn constructed in accordance with the principles of the present invention.
Figure 2:
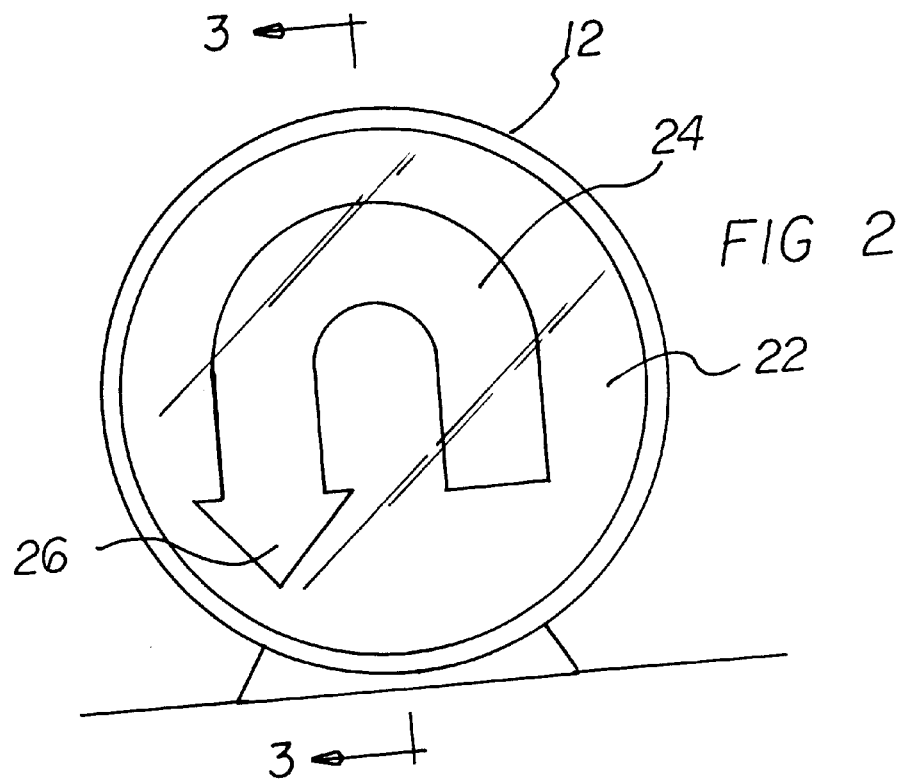
FIG. 2 is a front elevation view of the signaling device of the present invention.
Figure 3:
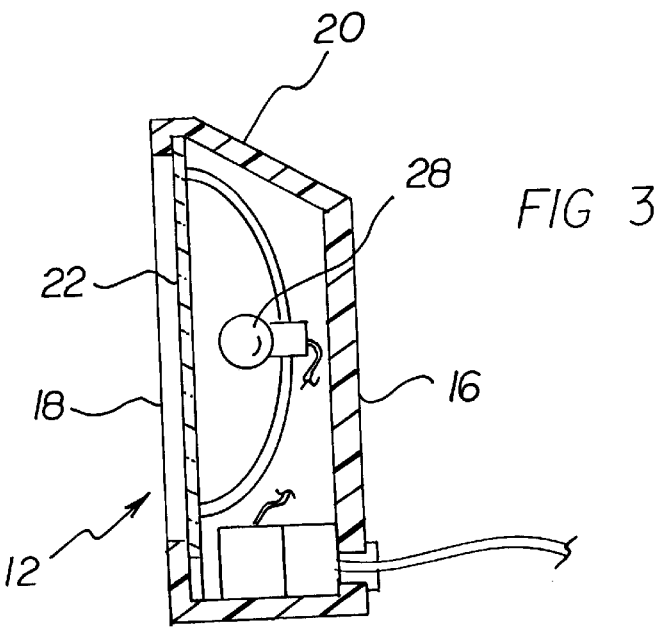
FIG. 3 is a cross-sectional view of the present invention as taken along line 3—3 of FIG. 2.
Figure 4:
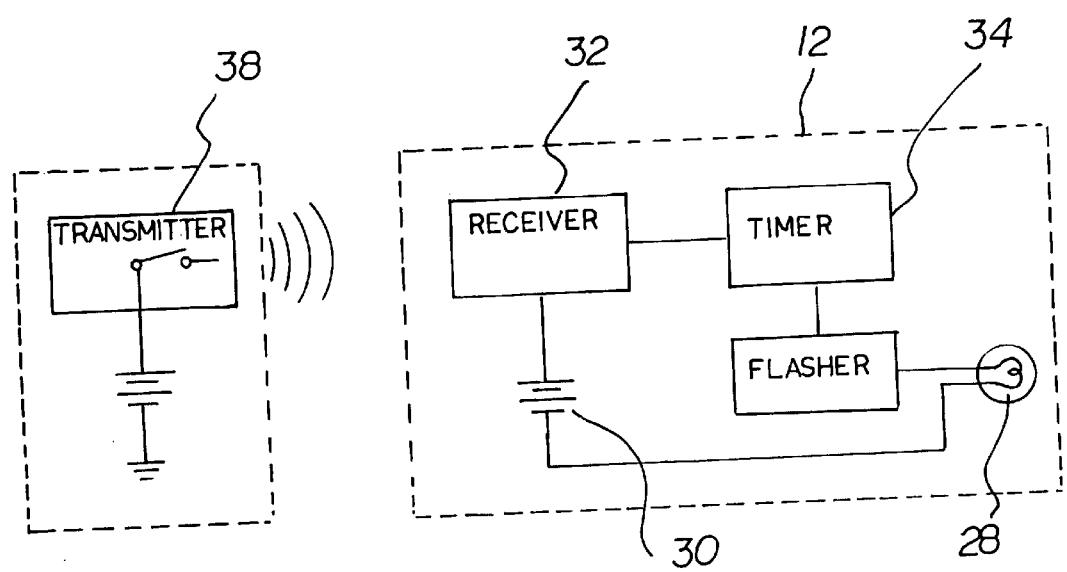
FIG. 4 is a schematic illustration of the present invention.

With reference now to the drawings, and in particular, to FIGS. 1 through 4 thereof, the preferred embodiment of the new and improved auxiliary signal to indicate a U-turn embodying the principles and concepts of the present invention and generally designated by the reference number 10 will be described.

Specifically, it will be noted in the various Figures that the device relates to a auxiliary signal to indicate a U-turn for alerting a vehicle traveling behind one's own vehicle that a U-turn will be performed. In its broadest context, the device consists of a housing, a light, a receiver, a timer, a flasher circuit and a transmitter. Such components are individually configured and correlated with respect to each other so as to attain the desired objective.

The housing 12 is securable to an interior of a motor vehicle 14 at a left corner of a rear window thereof. The housing 12 has a generally circular configuration defined by a closed forward face 16, an open rearward face 18 and a cylindrical side wall 20 therebetween. The open rearward face 18 has a plate 22 disposed therein. The plate 22 has an inverted translucent U 24 in a central portion thereof. One of two opposed free ends of the U 24 has an arrow 26 directed downwardly therefrom. An additional housing 12 could also be used in the front of the motor vehicle 12.

The light 28 is secured within the housing 12 intermediate the open rearward face 18 and the closed forward face 16 thereof. The light 28 is in communication with a battery 30 of the motor vehicle 14.

The receiver 32 is disposed within the housing 12. The receiver 32 is in communication with the light 28.

The timer 34 is disposed within the housing 12. The timer 34 is in communication with the light 28. The timer 34 will be preprogrammed to allow the light 28 to be activated for a certain length of time.

The flasher circuit 36 is disposed within the housing 12. The flasher circuit 36 is in communication with the light 28. The flasher circuit 36 enables the light 28 to illuminate intermittently.

The transmitter 38 is securable within the interior of the motor vehicle 14 adjacent to a drivers seat thereof. The transmitter 38 is in communication with the receiver 32. The transmitter 38 can be provided with it's own power source or can be connected to the battery 30 of the motor vehicle. The transmitter 38 will be provided with an activation button or switch that, when pressed, will signal to the receiver 32 to activate the light 28. The flasher circuit 36 will cause the light 28 to flash intermittently until the preprogrammed time of the timer 34 is reached whereupon the light 28 will automatically be deactivated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An auxiliary signal to indicate a U-turn for alerting a vehicle traveling behind one's own vehicle that a U-turn will be performed comprising, in combination:

a housing securable to an interior of a motor vehicle at a left corner of a rear window thereof, the housing having a generally circular configuration defined by a closed forward face, an open rearward face and a cylindrical side wall therebetween, the open rearward face having a plate disposed therein, the plate having an inverted translucent U in a central portion thereof, one of two opposed free ends of the U having an arrow directed downwardly therefrom;

a light secured within the housing intermediate the open rearward face and the closed forward face thereof, the light being in communication with a battery of the motor vehicle;

a receiver disposed within the housing, the receiver being in communication with the light;

a timer disposed within the housing, the timer being in communication with the light;

a flasher circuit disposed within the housing, the flasher circuit being in communication with the light;

a transmitter securable within the interior of the motor vehicle adjacent to a drivers seat thereof, the transmitter being in communication with the receiver.

2. An auxiliary signal to indicate a U-turn for alerting a vehicle traveling behind one's own vehicle that a U-turn will be performed comprising, in combination:

a housing securable to an interior of a motor vehicle, the housing being defined by a closed forward face and an open rearward face, the open rearward face having a plate disposed therein, the plate having an inverted translucent U in a central portion thereof;

a light secured within the housing intermediate the open rearward face and the closed forward face thereof, the light being in communication with a battery of the motor vehicle;

a receiver disposed within the housing, the receiver being in communication with the light;

a transmitter securable within the interior of the motor vehicle adjacent to a drivers seat thereof, the transmitter being in communication with the receiver.

3. The auxiliary signal to indicate a U-turn as set forth in claim 2 wherein the housing is securable to an interior of a motor vehicle at a left corner of a rear window thereof.

4. The auxiliary signal to indicate a U-turn as set forth in claim 2 wherein one of two opposed free ends of the U has an arrow directed downwardly therefrom.

5. The auxiliary signal to indicate a U-turn as set forth in claim 2 and further including a timer disposed within the housing, the timer being in communication with the light.

6. The auxiliary signal to indicate a U-turn as set forth in claim 2 and further including a flasher circuit disposed within the housing, the flasher circuit being in communication with the light.

* * * * *